(12) United States Patent
Park et al.

(10) Patent No.: US 8,046,724 B2
(45) Date of Patent: Oct. 25, 2011

(54) METHOD OF TIMING CRITICALITY CALCULATION FOR STATISTICAL TIMING OPTIMIZATION OF VLSI CIRCUIT

(75) Inventors: Hyoun Soo Park, Daegu (KR); Young Hwan Kim, Pohang Si (KR); Dai Joon Hyun, Seoul (KR); Wook Kim, Pohang Si (KR)

(73) Assignee: Postech Academy-Industry Foundation, Pohang, Kyungsanbuk-do (KR)

( * ) Notice: Subject to any disclaimer, the term of this patent is extended or adjusted under 35 U.S.C. 154(b) by 336 days.

(21) Appl. No.: 12/474,547

(22) Filed: May 29, 2009

(65) Prior Publication Data

US 2010/0242006 A1    Sep. 23, 2010

(30) Foreign Application Priority Data

Mar. 20, 2009    (KR) ........................ 10-2009-0024083

(51) Int. Cl.
G06F 9/455    (2006.01)
G06F 17/50   (2006.01)
(52) U.S. Cl. ...................................... 716/108; 716/134
(58) Field of Classification Search .................. 716/108
See application file for complete search history.

(56) References Cited

U.S. PATENT DOCUMENTS 7,458,049 B1 * 11/2008 Tuncer et al. ................. 716/113
2009/0288051 A1 * 11/2009 Hemmett et al. ................. 716/6

OTHER PUBLICATIONS

"Statistical Timing Optimization of VLSI Circuits under Process Variation" (Park, Hyun-Soo, Doctoral Degree Thesis, Invention Disclosed in pp. 91-114 (Nov. 11, 2008)).
Korean Intellectual Property Office, Non-final Rejection, Application No. 10-2009-0024083, dated Dec. 22, 2010.
Ihyoun Soo Park, Wook Kim, Dai Joon Hyun and Young Hwan Kim, Timing Criticality for Timing Yield Optimization, IEICE Transaction on Fundamentals of Electronics, Communications and Computer Sciences, Dec. 2008, pp. 3497-3505, vol. e91-A, No. 12.

* cited by examiner

Primary Examiner — Vuthe Siek
Assistant Examiner — Eric Lee
(74) Attorney, Agent, or Firm — Kile Park Goekjian Reed & McManus PLLC

(57) ABSTRACT

Provided is a method of optimizing statistical timing of an integration circuit, the method including applying subtle changes of mean arrival times with respect to each of nodes in a timing graph of an integrated circuit to ADD operations and MAX operations of a block-based statistical static timing analysis (SSTA) method and approximating the corresponding operations; generating Jacobian matrixes between each node by using matrix components including differential coefficients calculated during linear approximation of the operations; calculating changed arrival time values of the circuit by propagating the Jacobian matrixes from a virtual sink node to a virtual source node; and calculating timing yield criticalities, which are variances of timing yield of the circuit due to subtle changes of mean arrival times with respect to each node, based on values obtained by the propagation. Accordingly, timing yield criticality is calculated based on linear approximation of ADD operations and MAX operations of statistical static timing analysis (SSTA), and thus the calculation complexity is linear with respect to the total number of nodes, and critical nodes significantly affecting the timing yield of a circuit can be extracted more accurately.

9 Claims, 2 Drawing Sheets

METHOD OF TIMING CRITICALITY CALCULATION FOR STATISTICAL TIMING OPTIMIZATION OF VLSI CIRCUIT

CROSS-REFERENCE TO RELATED PATENT APPLICATION

This application claims the benefit of Korean Patent Application No. 10-2009-0024083, filed on Mar. 20, 2009, in the Korean Intellectual Property Office, the disclosure of which is incorporated herein in its entirety by reference.

BACKGROUND OF THE INVENTION

1. Field of the Invention

The present invention relates to a method of timing optimization of an integrated circuit, and more particularly, to a method of efficiently calculating timing yield criticality, which is newly defined for effectively determining nodes significantly affecting a timing yield of an integrated circuit, for statistical timing optimization of integrated circuits.

2. Description of the Related Art

In fabrication of very-large-scale-integration (VLSI) circuits, variations in chip performance become more significant due to variations in the manufacturing process, which is increased as fabrication techniques become more intricate, and thus a loss in chip yield becomes a serious problem. Examples of conventional methods of analyzing timing in consideration of the process variation include corner-based static timing analysis and Monte-Carlo simulation-based static timing analysis. According to the corner-based static timing analysis, a timing variation in a chip is predicted based on analysis at a couple of important process corners, such as in the case of the best parameter conditions affecting improvement in the chip's operating speed, the case of the worst parameter conditions, and the case of normal parameter conditions. The method of analysis may significantly overrate the effect of process variations with respect to chip timing in a current nanometer process in which both process variations between chips and process variations within a chip significantly affect chip performance.

According to the other conventional method of analyzing timing, that is, the Monte-Carlo simulation-based static timing analysis, a highly accurate analysis result can be obtained. However, calculation thereof is highly complicated, and thus it is practically impossible to apply the method to actual chip design.

As an alternative to such conventional analyzing methods, statistical static timing analysis (SSTA) has been suggested. According to the SSTA, timings of a chip are indicated as a probability distribution, and timing yield, which is a probability that a chip satisfies given timing-limiting conditions, is predicted based on the distribution of probabilities. SSTA can be roughly classified into path-based SSTA and block-based SSTA. According to the path-based SSTA, a timing distribution of a chip is predicted by analyzing timings of potential critical paths that are selected in advance.

In conventional static timing analysis, a critical path has the longest delay from among all paths, and thus can be easily confirmed. Meanwhile, in SSTA, delays of all circuit components are indicated by random variables, and every path has a probability of becoming a critical path. Thus, a new method, which is different from the method used in static timing analysis (STA), is required to determine a critical path in SSTA.

References regarding conventional techniques to which SSTA is applied are shown below.

Reference 1: C. Visweswariah, K. Ravindran, K. Kalafala, S. G. Walker, S. Narayan, D. K. Beece, J. Piaget, N. Venkateswaran, and J. G. Hemmett, "First-order incremental block-based statistical timing analysis," IEEE Transactions on Computer-Aided Design of Integrated Circuits and Systems, vol. 25, no. 10, pp. 2170-2180, October 2006.

Reference 2: X. Li, J. Le, M. Celik, and L. T. Pileggi, "Defining statistical sensitivity for timing optimization of logic circuits with large-scale process and environmental variations," Proc. International Conf. on Computer-Aided Design, pp. 844-851, November 2005.

Timing analysis regarding a digital circuit is performed in the timing graph shown in FIG. 1, for example. In order to simplify timing analysis regarding a circuit, primary input nodes 1, 2, 3, and 4 of the timing graph and primary output nodes 9 and 10 of the timing graph are connected to a virtual source node 100 and a virtual sink node 110, respectively. The virtual source node 100 becomes the origin of all circuit signals, whereas the virtual sink nodes 110 becomes the final destination of all circuit signals.

In general digital circuits, input pins and output pins of gates are converted to nodes corresponding to each of the pins. Signal paths from input pins to output pins of gates and delays thereof are converted to edges between nodes and to edge delays, respectively. Furthermore, connecting lines between gates and delays thereof are also converted to edges and edge delays, respectively.

In the reference 1, timing criticalities of paths, nodes, and edges are defined using tightness probability. In the reference 1, path criticality indicates a probability that a corresponding path has the longest delay, whereas node/edge criticalities indicate corresponding node/edge are located on a critical path.

In the reference 2, sensitivities of paths and arcs, which are defined by the sensitivity of mean arrival time at a virtual sink node, with respect to mean delay of paths or arcs, are suggested for timing criticality. Sensitivities of paths and arcs represent a probability that a corresponding path becomes a critical path and a probability that a corresponding arc is located on the critical path, respectively, which are similar to criticalities of paths and edges. Thus, the most critical path based on timing criticalities suggested in the references 1 and 2 is a path having the highest probability that the path becomes a critical path, and the most critical node/edges are a node and an edge that have the highest probability that the path becomes a critical node and a critical edge, respectively.

In SSTA, delays of all gates affect timing yield of chips, and optimization of timing yield is achieved by gate replacement. Therefore, node/edge timing criticalities should be defined in a timing graph to determine gates significantly affecting timing yield.

However, conventional timing criticalities suggested in references 1 and 2 are not defined in view of timing yield, and thus there are cases where the most critical node/edge predicted based on the definitions of references 1 and 2 are not node/edge affecting the timing yield most significantly, in reality.

SUMMARY OF THE INVENTION

The present invention defines timing yield criticality (TYC), which is timing criticality for determining a critical node of a very-large-scale-integration (VLSI) circuit more accurately, and provides a method of extracting critical gates for statistical timing optimization of an integrated circuit, the method including calculating the TYC based on the definition.

According to an aspect of the present invention, there is provided a method of optimizing statistical timing of an integration circuit, the method including applying subtle changes of mean arrival times with respect to each of nodes in a timing graph of an integrated circuit to ADD operations and MAX operations of a block-based statistical static timing analysis (SSTA) method and approximating the corresponding operations; generating Jacobian matrixes between each node by using matrix components including differential coefficients calculated during linear approximation of the operations; calculating changed arrival time values of the circuit by propagating the Jacobian matrixes from a virtual sink node to a virtual source node; and calculating timing yield criticalities, which are variances of timing yield of the circuit due to subtle changes of mean arrival times with respect to each node, based on values obtained by the propagation.

Furthermore, when a mean arrival time $a_0$ of a first node is changed to $\delta a_0$, a changed arrival time $C'$ of a third node, which is directly connected to a first node as an output node of the first node, is approximated by multiplying differential coefficients of delay components of the third node by $\delta a_0$, in the approximation of the MAX operations.

Furthermore, the changed arrival time $C'$ of the third node, which is directly connected to the first node and a second node as an output node of the first and second nodes, is approximated according to an equation $$C' = \max(A', B)$$
$$= (c_0 + \delta c_0) + \left(\sum_{i=1}^{n}(c_i + \delta c_i) \cdot \Delta X_i\right) + (c_{n+1} + \delta c_{n+1}) \cdot \Delta R_C,$$
$$\therefore \begin{cases} \delta c_i \approx \dfrac{\partial c_i}{\partial a_0} \cdot \delta a_0, \ 0 \le i \le n \\ \delta c_{n+1}^2 \approx \dfrac{\partial c_{n+1}^2}{\partial a_0} \cdot \delta a_0 \end{cases}$$

where $A'$ indicates a changed arrival time of the first node, and $B$ indicates an arrival time of the second node.

Furthermore, a changed arrival time $E'$ of a fifth node, which is indirectly connected to the first node as an output node of the first node, is approximated according to the chain rule of differential coefficients, in the approximation of the MAX operations.

Furthermore, the changed arrival time $E'$ of the fifth node is defined as shown in an equation $$E' = \max(C', D)$$
$$= (e_0 + \delta e_0) + \left(\sum_{i=1}^{n}(e_i + \delta e_i) \cdot \Delta X_i\right) + (e_{n+1} + \delta e_{n+1}) \cdot \Delta R_E$$
$$\therefore \begin{cases} \delta e_i \approx \dfrac{\partial e_i}{\partial a_0} \cdot \delta a_0, \ 0 \le i \le n \\ \quad = \left(\sum_{j=1}^{n}\dfrac{\partial e_i}{\partial c_j} \cdot \dfrac{\partial c_j}{\partial a_0} + \dfrac{\partial e_i}{\partial c_{n+1}^2} \cdot \dfrac{\partial c_{n+1}^2}{\partial a_0}\right) \cdot \delta a_0 \\ \delta e_{n+1}^2 \approx \dfrac{\partial e_{n+1}^2}{\partial a_0} \cdot \delta a_0 \\ \quad = \left(\sum_{j=1}^{n}\dfrac{\partial e_{n+1}^2}{\partial c_j} \cdot \dfrac{\partial c_j}{\partial a_0} + \dfrac{\partial e_{n+1}^2}{\partial c_{n+1}^2} \cdot \dfrac{\partial c_{n+1}^2}{\partial a_0}\right) \cdot \delta a_0, \end{cases}$$

where $D$ indicates an arrival time of the fourth node.

Furthermore, differential coefficients for linear approximation of the MAX operation is calculated by partially differentiating output delay components with respect to input delay components, that is, $$\frac{\partial c_0}{\partial a_0} = T_A$$
$$\frac{\partial c_0}{\partial a_i} = \frac{\partial c_i}{\partial a_0} = \gamma_i \phi(\gamma_0), \ 1 \le i \le n$$
$$\frac{\partial c_0}{\partial a_{n+1}^2} = \frac{\phi(\gamma_0)}{2\theta}$$
$$\frac{\partial c_j}{\partial a_i} = \begin{cases} T_A - \gamma_0 \gamma_i \gamma_j \phi(\gamma_0), & i = j \\ -\gamma_0 \gamma_i \gamma_j \phi(\gamma_0), & i \ne j \end{cases}, \ 1 \le i, j \le n$$
$$\frac{\partial c_j}{\partial a_{n+1}^2} = \gamma_0 \gamma_j \frac{\phi(\gamma_0)}{2\theta}, \ 1 \le j \le n$$
$$\frac{\partial c_{n+1}^2}{\partial a_0} = 2a_0 T_A + (\sigma_A^2 - \sigma_B^2)\frac{\phi(\gamma_0)}{\theta} + \theta \phi(\gamma_0) - 2\sum_{k=0}^{n} c_k \frac{\partial c_k}{\partial a_0}$$
$$\frac{\partial c_{n+1}^2}{\partial a_i} = 2a_i T_A - (\sigma_A^2 + a_0^2 - \sigma_B^2 - b_0^2)\gamma_0 \gamma_i \frac{\phi(\gamma_0)}{\theta} +$$
$$(a_0 + b_0)(1 + \gamma_0^2)\gamma_i \phi(\gamma_0) - 2\sum_{k=0}^{n} c_k \frac{\partial c_k}{\partial a_i}, \ 1 \le i \le n$$
$$\frac{\partial c_{n+1}^2}{\partial a_{n+1}^2} = T_A - (\sigma_A^2 + a_0^2 - \sigma_B^2 - b_0^2)\gamma_0 \frac{\phi(\gamma_0)}{\theta} +$$
$$(a_0 + b_0)(1 + \gamma_0^2)\frac{\phi(\gamma_0)}{2\theta} - 2\sum_{k=0}^{n} c_k \frac{\partial c_k}{\partial a_{n+1}^2}$$

where $\gamma_k = \dfrac{a_k - b_k}{\theta}$.

Furthermore, if an arrival time $A$ of a first node is a result of an ADD operation of arrival times $B$ and $C$ of second and third nodes and delay components in the first node are changed by as much as $\delta a_i$ ($i=1, 2, \ldots, n+1$), an arrival time $C'$, which is changed due to a change of the arrival time $A$, is approximated according to an equation $$C' = \text{add}(A', B)$$
$$= (c_0 + \delta c_0) + \left(\sum_{i=1}^{n}(c_i + \delta c_i) \cdot \Delta X_i\right) + (c_{n+1} + \delta c_{n+1}) \cdot \Delta R_C$$
$$\therefore \begin{cases} \delta c_i = \dfrac{\partial c_i}{\partial a_i} \cdot \delta a_i, \ 0 \le i \le n \\ \delta c_{n+1}^2 = \dfrac{\partial c_{n+1}^2}{\partial a_{n+1}^2} \cdot \delta a_{n+1}^2 \end{cases}$$

Furthermore, differential coefficients for linear approximation of the ADD operation are calculated by partially differentiating output delay components with respect to input delay components of the ADD operation, as shown in an equation $$\frac{\partial c_j}{\partial a_i} = \begin{cases} 1, & i = j \\ 0, & i \ne j \end{cases}, \ 0 \le i, j \le n$$
$$\frac{\partial c_i}{\partial a_{n+1}^2} = \frac{\partial c_{n+1}^2}{\partial a_i} = 0, \ 0 \le i \le n$$

$$\frac{\partial c_{n+1}^2}{\partial a_{n+1}^2} = 1.$$

Furthermore, propagation of the Jacobian matrixes from the virtual sink node to the virtual source node is performed using a backward breadth-first search method by multiplying the matrixes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2:
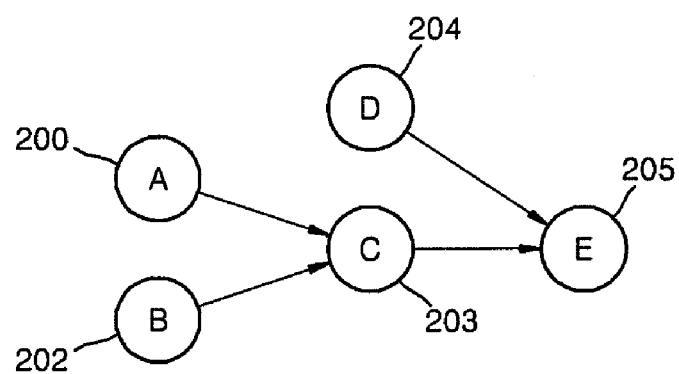
FIG. 2 is a timing graph for describing timing yield criticality (TYC) of the present invention.

FIG. 2 is a timing graph for describing TYC of the present invention, wherein each of nodes 200 through 205 corresponds to arrival times A through E, which are time variables in the corresponding nodes, respectively. In FIG. 2, the node 205 is assumed to be a virtual sink node.

First, a block-based statistical static timing analysis (SSTA), in which a mathematical equation is used to calculate the TYC, according to the present invention will be described. In a first-order block-based SSTA, delays in a circuit are indicated in normal first-order form having normal distribution as shown in Equation 1.

$$a_0 + \sum_{i=1}^{n} a_i \cdot \Delta X_i + a_{n+1} \cdot \Delta R_a \quad \text{[Equation 1]}$$

Here, $a_0$ indicates the mean arrival time obtained from mean values of process parameters, $\Delta X_i$ (i=1, 2, . . . , n) indicates a variation of the global parameter $X_i$ (i=1, 2, . . . , n), and $a_i$ (i=1, 2, . . . , n) indicates delay sensitivity of $\Delta X_i$. $\Delta R_a$ indicates a variation from the mean value of the independent random variable $R_a$, and $a_{n+1}$ indicates delay sensitivity with respect to $\Delta R_a$. At this point, $\Delta X_i$ (i=1, 2, . . . , n) and $\Delta R_a$ have standard normal distributions.

Delays of each of nodes and each of edges in a digital circuit having the structure definition shown in Equation 1 propagate from a virtual source node to a virtual sink node by using an ADD operation and a MAX operation that are defined in block-based SSTA.

The ADD operation and the MAX operation can be expressed as shown in Equation 2 using the arrival times A, B, and C at the nodes 200, 202, and 204.

$$A = a_0 + \left(\sum_{i=1}^{n} a_i \cdot \Delta X_i\right) + a_{n+1} \cdot \Delta R_a \quad \text{[Equation 2]}$$

$$B = b_0 + \left(\sum_{i=1}^{n} b_i \cdot \Delta X_i\right) + b_{n+1} \cdot \Delta R_b$$

$$C = c_0 + \left(\sum_{i=1}^{n} c_i \cdot \Delta X_i\right) + c_{n+1} \cdot \Delta R_c$$

The ADD operation performed on two random variables having standard normal distributions generates another random variable having a standard normal distribution. If the arrival time C is generated by performing the ADD operation on the arrival times A and B, C=ADD(A, B) as shown in Equation 3.

$$c_i = a_i + b_i, \ i=0,1,\ldots,n$$

$$c_{n+1} = \sqrt{a_{n+1}^2 + b_{n+1}^2} \quad \text{[Equation 3]}$$

Variances of the arrival times A and B shown in Equation 2, which are $\sigma_A^2$ and $\sigma_B^2$, can be obtained according to Equation 4 below.

$$\sigma_A^2 = \sum_{i=1}^{n+1} a_i^2, \ \sigma_B^2 = \sum_{i=1}^{n+1} b_i^2 \quad \text{[Equation 4]}$$

Furthermore, a correlation coefficient between the arrival times A and B can be expressed as shown in Equation 5 below.

$$\rho = \frac{\sum_{i=1}^{n} a_i b_i}{\sigma_A \sigma_B} \quad \text{[Equation 5]}$$

For the MAX operation to be performed on the arrival times A and B, that is, calculation of MAX(A, B), calculations of $T_A$ and $T_B$, which are tightness probabilities of the arrival times A and B, should be performed in advance. $T_A$ indicates a probability that the arrival time A is later than the arrival time B, whereas $T_B$ indicates a value obtained by subtracting $T_A$ from 1. The $T_A$ can be calculated as shown in Equation 6.

$$T_A = \int_{-\infty}^{\infty} \frac{1}{\sigma_A} \phi\left(\frac{x-a_0}{\sigma_A}\right) \Phi\left(\frac{\left(\frac{x-b_0}{\sigma_B}\right) - \rho\left(\frac{x-a_0}{\sigma_A}\right)}{\sqrt{1-\rho^2}}\right) \quad \text{[Equation 6]}$$

$$= \Phi\left(\frac{a_0 - b_0}{\theta}\right)$$

where, $$\phi(x) \equiv \frac{1}{\sqrt{2\pi}} \exp\left(-\frac{x^2}{2}\right)$$

$$\Phi(y) \equiv \int_{-\infty}^{y} \phi(x) dx$$

$$\theta \equiv (\sigma_A^2 + \sigma_B^2 - 2\rho\sigma_A\sigma_B)^{\frac{1}{2}}$$

The mean value $\mu_{max}$ and distribution $\sigma_{max}^2$ of two random variables having normal distributions can be expressed as shown in Equations 7 and 8 below.

$$\mu_{max} = a_0 T_A + b_0 T_B + \theta\phi\left(\frac{a_0 - b_0}{\theta}\right) \quad \text{[Equation 7]}$$

$$\sigma_{max}^2 = \quad \text{[Equation 8]}$$
$$(\sigma_A^2 + a_0^2)T_A + (\sigma_B^2 + b_0^2)T_B + (a_0 + b_0)\theta\phi\left(\frac{a_0 - b_0}{\theta}\right) - \mu_{max}^2$$

A result of the MAX operation performed on two random variables having normal distributions is not a perfectly normal distribution. However, a result of the MAX operation is approximated via moment matching like as normal distribution for delay propagation in a timing graph. A result thereof C=MAX(A, B) is as shown in Equation 9 below.

$$c_0 = \mu_{max} \quad \text{[Equation 9]}$$
$$c_i = a_i T_A + b_i T_B, i = 1, 2, \ldots, n$$
$$c_{n+1} = \sqrt{\sigma_{max}^2 - \sum_{i=1}^{n} c_i^2}$$

As shown in Equation 9, the mean value of MAX(A, B) is maintained even if a result of MAX(A, B) is converted into normal form. Then, a random variable $C_i$ (i=1, 2, ..., n) is obtained based on a ratio of tightness probabilities of $a_i$ to $b_i$. Finally, the delay sensitivity $C_{n+1}$ of an independent random variable can be obtained by matching a variance obtained from the normal first-order form to a variance obtained according to Equation 8.

Figure 3:
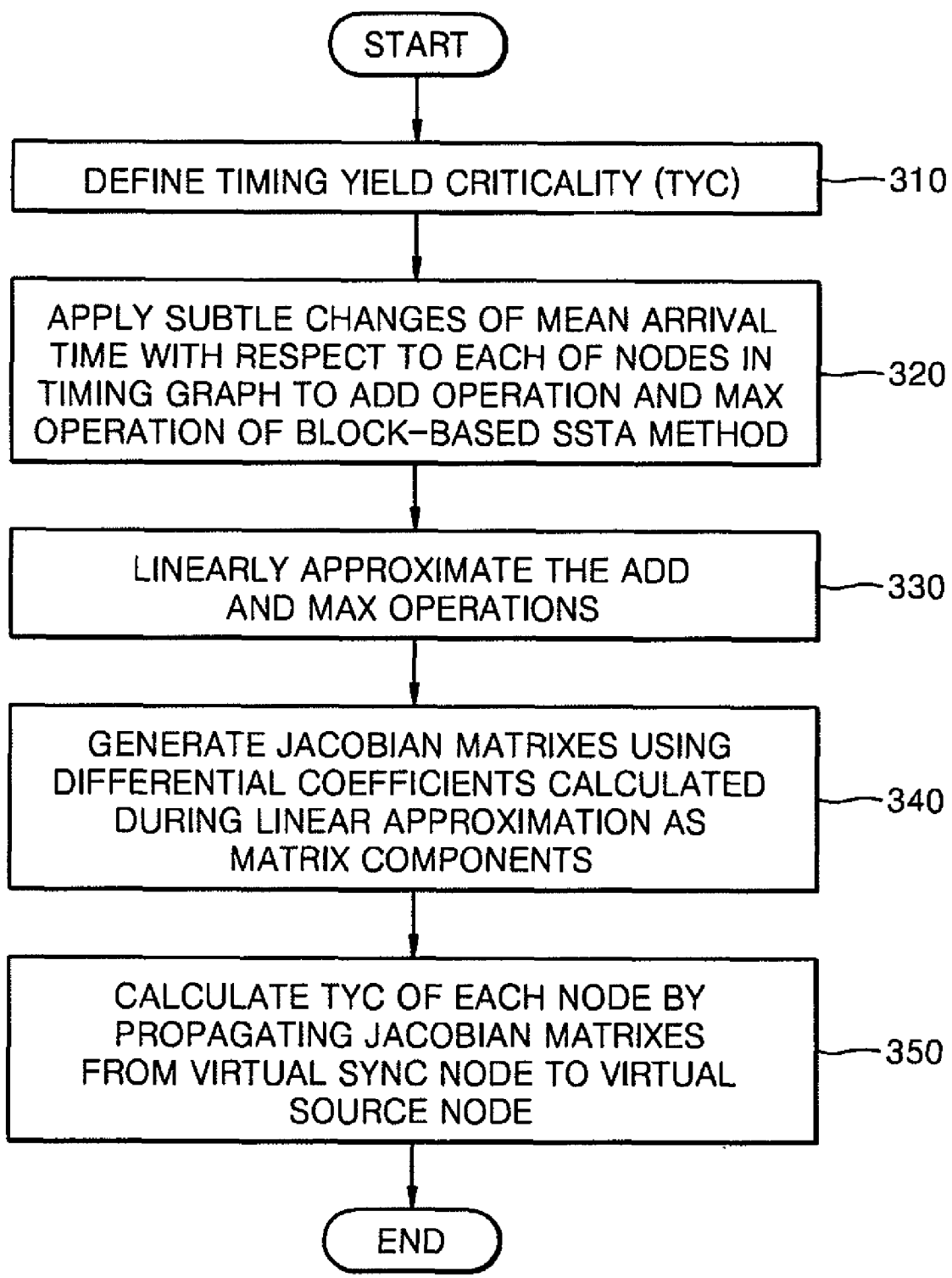
FIG. 3 is a flowchart for describing the calculation of TYC according to the present invention.

FIG. 3 is a flowchart for describing the calculation of TYC according to the present invention.

In operation 310, TYC, which is the timing yield criticality with respect to each node on a timing graph, is defined as shown in Equation 10.

$$TYC_{node} = \frac{\delta P(\text{circuit delay} \leq T_{constraint})}{\delta E(\text{node delay})} \quad \text{[Equation 10]}$$

Here, P indicates a probability that a circuit delay, which is an arrival time in a virtual sink node, is smaller than or equal to $T_{constraint}$. Furthermore, $\delta E$ (node delay) indicates a variance of a mean arrival time in each node.

Effects on timing yields of each node are variances of timing yields obtained by varying arrival times of each node by as much as general delay variations occurring at replaced gates and propagating the effect of the delay variation to a virtual sink node.

In the present invention, $\delta E$ (node delay) is assumed as a value significantly smaller than a general delay variation occurring by gate replacement. According to the definition of TYC, the mode critical node based on TYC changes the timing yield more significantly compared to other nodes when mean arrival times of each node are changed by as much as $\delta E$ (node delay).

In a timing graph, it is necessary to propagate a changed arrival time of a node to a virtual sink node to calculate the timing yield changed due to the variation of the arrival time at the node. The computational complexity of this calculation is indicated as 0(n), wherein n indicates a total number of nodes in the timing graph. Therefore, the calculation complexity $0(n^2)$ is necessary to calculate the TYC of all nodes. However, the calculation complexity is too high as compared to the calculation complexity 0(n) of block-based SSTA, and thus a method of calculating TYC based on linear approximation is suggested for calculating the TYC more efficiently.

A method of calculating the TYC according to the present invention is described based on the normal first-order delay model and the first order block-based SSTA, shown in Equation 1.

When normal first-order delays propagate in the first order block-based SSTA for the method of calculating TYC, the square term of an independent random variable propagates.

Figure 1:
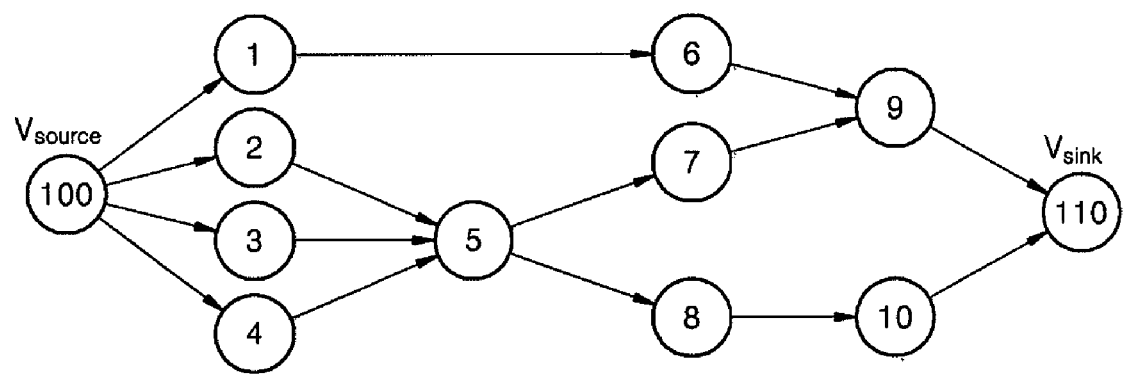
FIG. 1 is a diagram for describing nodes of a general timing graph.

A method of calculating the TYC will be described below in reference to the timing graph of FIG. 1.

Fine variations of mean arrival times with respect to each node on the timing graph are applied to an ADD operation and a MAX operation of a block-based SSTA method, and the operations are linearly approximated (operations 320 and 330).

In the timing graph of FIG. 2, it is assumed that delays of edges are 0. When the mean arrival time $a_0$ of the node 200 shown in FIG. 2 is changed by as much as $\delta a_0$, changed arrival times C' and E' of the nodes 203 and 205 are linearly approximated as shown in Equations 11 and 12 below.

$$C' = \max(A', B) \quad \text{[Equation 11]}$$
$$= (c_0 + \delta c_0) + \left(\sum_{i=1}^{n}(c_i + \delta c_i) \cdot \Delta X_i\right) +$$
$$(c_{n+1} + \delta c_{n+1}) \cdot \Delta R_C$$
$$\therefore \begin{cases} \delta c_i \approx \frac{\partial c_i}{\partial a_0} \cdot \delta a_0, \quad 0 \leq i \leq n \\ \delta c_{n+1}^2 \approx \frac{\partial c_{n+1}^2}{\partial a_0} \cdot \delta a_0 \end{cases}$$

$$E' = \max(C', D) \quad \text{[Equation 12]}$$
$$= (e_0 + \delta e_0) + \left(\sum_{i=1}^{n}(e_i + \delta e_i) \cdot \Delta X_i\right) +$$
$$(e_{n+1} + \delta e_{n+1}) \cdot \Delta R_E$$
$$\therefore \begin{cases} \delta e_i \approx \frac{\partial e_i}{\partial a_0} \cdot \delta a_0, \quad 0 \leq i \leq n \\ \quad = \left(\sum_{j=1}^{n} \frac{\partial e_i}{\partial c_j} \cdot \frac{\partial c_j}{\partial a_0} + \frac{\partial e_i}{\partial c_{n+1}^2} \cdot \frac{\partial c_{n+1}^2}{\partial a_0}\right) \cdot \\ \quad \delta a_0 \\ \delta e_{n+1}^2 \approx \frac{\partial e_{n+1}^2}{\partial a_0} \cdot \delta a_0 \\ \quad = \left(\sum_{j=1}^{n} \frac{\partial e_{n+1}^2}{\partial c_j} \cdot \frac{\partial c_j}{\partial a_0} + \frac{\partial e_{n+1}^2}{\partial c_{n+1}^2} \cdot \frac{\partial c_{n+1}^2}{\partial a_0}\right) \cdot \\ \quad \delta a_0 \end{cases}$$

The changed arrival time C' is approximated by multiplying differential coefficients of delay components of the mean arrival time in the node 204 with respect to a0 by $\delta a_0$. In block-based SSTA, the square term of delay sensitivity of an independent random variable propagates. Thus, the differential coefficient of $C_{n+1}^2$ with respect to $a_0$ is calculated from the approximation of C', and variation in $C_{n+1}^2$ is approximated. As shown in Equation 12, E' is approximated according to the chain rule of differential coefficients.

Linear approximation of the ADD operation is also calculated by using mathematical expressions such as Equations 11 and 12. If the arrival time A is a result of the ADD operation of the arrival times B and C and delay components in the node 200 are changed by as much as $\delta a_i$ (i=1, 2, ..., n+1), an arrival time changed due to a change in the arrival time A, that is, the changed arrival time, C' is approximated as shown in Equation 13.

$$C' = \text{add}(A', B) \quad \text{[Equation 13]}$$
$$= (c_0 + \delta c_0) + \left(\sum_{i=1}^{n}(c_i + \delta c_i) \cdot \Delta X_i\right) +$$
$$(c_{n+1} + \delta c_{n+1}) \cdot \Delta R_C$$
$$\therefore \begin{cases} \delta c_i = \dfrac{\partial c_i}{\partial a_i} \cdot \delta a_i, & 0 \le i \le n \\ \delta c_{n+1}^2 = \dfrac{\partial c_{n+1}^2}{\partial a_{n+1}^2} \cdot \delta a_{n+1}^2 \end{cases}$$

Differential coefficients of Equations 14 and 15 for linear approximation of ADD operation and MAX operation are calculated by partially differentiating output delay components with respect to input delay components of each of the operations shown in Equations 3 and 9.

1) Differential Coefficients for Linear Approximation of ADD Operation $$\frac{\partial c_j}{\partial a_i} = \begin{cases} 1, & i = j \\ 0, & i \ne j \end{cases}, \quad 0 \le i, j \le n \quad \text{[Equation 14]}$$
$$\frac{\partial c_i}{\partial a_{n+1}^2} = \frac{\partial c_{n+1}^2}{\partial a_i} = 0, \quad 0 \le i \le n$$
$$\frac{\partial c_{n+1}^2}{\partial a_{n+1}^2} = 1$$

2) Differential Coefficients for Linear Approximation of MAX Operation $$\frac{\partial c_0}{\partial a_0} = T_A \quad \text{[Equation 15]}$$
$$\frac{\partial c_0}{\partial a_i} = \frac{\partial c_i}{\partial a_0} = \gamma_i \phi(\gamma_0), \quad 1 \le i \le n$$
$$\frac{\partial c_0}{\partial a_{n+1}^2} = \frac{\phi(\gamma_0)}{2\theta}$$
$$\frac{\partial c_j}{\partial a_i} = \begin{cases} T_A - \gamma_o \gamma_i \gamma_j \phi(\gamma_0), & i = j \\ -\gamma_o \gamma_i \gamma_j \phi(\gamma_0), & i \ne j \end{cases}, \quad 1 \le i, j \le n$$
$$\frac{\partial c_j}{\partial a_{n+1}^2} = \gamma_o \gamma_j \frac{\phi(\gamma_0)}{2\theta}, \quad 1 \le j \le n$$
$$\frac{\partial c_{n+1}^2}{\partial a_0} =$$
$$2a_0 T_A + (\sigma_A^2 - \sigma_B^2)\frac{\phi(\gamma_0)}{\theta} + \theta\phi(\gamma_0) - 2\sum_{k=0}^{n} c_k \frac{\partial c_k}{\partial a_0}$$
$$\frac{\partial c_{n+1}^2}{\partial a_i} = 2a_i T_A - (\sigma_A^2 + a_0^2 - \sigma_B^2 - b_0^2)\gamma_o \gamma_i \frac{\phi(\gamma_0)}{\theta} + (a_0 + b_0)$$
$$(1+\gamma_0^2)\gamma_i \phi(\gamma_0) - 2\sum_{k=0}^{n} c_k \frac{\partial c_k}{\partial a_i}, \quad 1 \le i \le n$$
$$\frac{\partial c_{n+1}^2}{\partial a_{n+1}^2} = T_A - (\sigma_A^2 + a_0^2 - \sigma_B^2 - b_0^2)\gamma_0 \frac{\phi(\gamma_0)}{\theta} +$$
$$(a_0 + b_0)(1 + \gamma_0^2)\frac{\phi(\gamma_0)}{2\theta} - 2\sum_{k=0}^{n} c_k \frac{\partial c_k}{\partial a_{n+1}^2}$$
$$\text{where } \gamma_k = \frac{a_k - b_k}{\theta}$$

Using differential coefficients of delay components of arrival times at a virtual sink node with respect to delay components of arrival times of each node, a changed arrival time in a virtual sink node 205 due to very small changes of mean arrival times of each node is predicted. At this point, required differential coefficients are calculated using the chain rule of differential coefficients of ADD operations and MAX operations that are calculated according to Equations 14 and 15.

In operation 340, Jacobian matrixes, which include differential coefficients calculated during linear approximation of ADD operations and MAX operations as matrix components, are generated.

The Jacobian matrix $J_{A \to C}$ from the node 200 to the node 203 is generated as shown in Equation 16.

$$J_{A \to C} = \begin{bmatrix} \dfrac{\partial c_0}{\partial a_0} & \dfrac{\partial c_0}{\partial a_1} & \cdots & \dfrac{\partial c_0}{\partial a_n} & \dfrac{\partial c_0}{\partial a_{n+1}^2} \\ \dfrac{\partial c_1}{\partial a_0} & \dfrac{\partial c_1}{\partial a_1} & \cdots & \dfrac{\partial c_1}{\partial a_n} & \dfrac{\partial c_1}{\partial a_{n+1}^2} \\ \vdots & \vdots & \ddots & \vdots & \vdots \\ \dfrac{\partial c_n}{\partial a_0} & \dfrac{\partial c_n}{\partial a_1} & \cdots & \dfrac{\partial c_n}{\partial a_n} & \dfrac{\partial c_n}{\partial a_{n+1}^2} \\ \dfrac{\partial a_{n+1}^2}{\partial a_0} & \dfrac{\partial a_{n+1}^2}{\partial a_1} & \cdots & \dfrac{\partial a_{n+1}^2}{\partial a_n} & \dfrac{\partial a_{n+1}^2}{\partial a_{n+1}^2} \end{bmatrix} \quad \text{[Equation 16]}$$

In operation 350, Jacobian matrixes propagate from the virtual sink node 205 to a virtual source node, and TYC with respect to each of the nodes shown in FIG. 2 are calculated based on the result of propagation. Here, the calculated results refer to changed arrival times of a circuit due to subtle variations of arrival times in each node.

The Jacobian matrix $J_{A \to C}$ includes first-order differential coefficients of the components of the arrival time C of the node 203 with respect to the components of the arrival time A of the node 200. To calculate approximated TYC of all nodes, Jacobian matrixes of arrival times of the virtual sink node 205 with respect to arrival times of all nodes are calculated. An algorithm used for propagation of a sensitivity matrix, disclosed in the reference 2, may be used to calculate the Jacobian matrixes. According to the algorithm, Jacobian matrixes for ADD operations and MAX operations are propagated from the virtual sink node 205 to a virtual source node (not shown) in front of the nodes 200 and 202 according to a backward breadth-first search method.

To propagate Jacobian matrixes to a virtual source, two Jacobian matrixes $J_{C \to E}$ and $J_{D \to E}$ of arrival times of the node 208 with respect to arrival times of the nodes 203 and 204 are calculated, wherein the matrixes include differential coefficients shown in Equation 15. At this point, the $J_{C \to E}$ propagates to the nodes 200 and 202, which are inputs of the node 204. Next, $J_{A \to E}$ and $J_{B \to E}$, which are Jacobian matrixes of arrival time E of the node 205 with respect to the arrival times A and B in the nodes 200 and 202 are calculated using the $J_{C \to E}$. The matrix $J_{A \to E}$ is calculated by multiplying the $J_{C \to E}$ by the $J_{A \to C}$.

In other words, $J_{A \to E} = J_{C \to E} J_{A \to C}$, and similarly, $J_{B \to E} = J_{C \to E} J_{B \to C}$. Accordingly, Jacobian matrixes propagate from the virtual sink node 205 to a virtual source node (not shown) through multiplication of Jacobian matrixes. Jacobian matrixes for ADD operations become identity matrixes according to Equation 14, and thus are excluded from the matrix multiplication for propagation of Jacobian matrixes.

The method of calculating sensitivity suggested in the reference 2 is based on a normal first-order delay model requiring scaling of delay sensitivities of random variables for variance matching performed in a MAX operation. However, the method of calculating sensitivity does not consider the scaling.

Meanwhile, a method of calculating TYC is based on the normal first-order delay model shown in Equation 1. The model uses delay sensitivity of an independent random variable, and thus it does not require scaling of delay sensitivities of random variables for matching variances. Therefore, linear approximation of MAX operations using the sensitivity matrix of the reference 2 instead of a Jacobian matrix may cause significant error.

Table 1 is a comparison of performance of the method proposed in the present invention, the reference 2 and the reference 1.

TABLE 1

| | | TYC by the proposed method | | | (Reference 2) Sensitivity | | | (Reference 1) Criticality | | |
|---|---|---|---|---|---|---|---|---|---|---|
| | | [1]MCN | [%] of critical nodes in the top | | MCN | [%] of critical nodes in the top | | MCN | [%] of critical nodes in the top | |
| Circuit | # of gates | Order | 1% | 3% | Order | 1% | 3% | Order | 1% | 3% |
| C432 | 141 | 1 | 100.0 | 100.0 | 6 | 0.0 | 50.0 | 6 | 0.0 | 50.0 |
| C499 | 184 | 1 | 100.0 | 100.0 | 10 | 0.0 | 33.3 | 10 | 0.0 | 16.7 |
| C880 | 250 | 1 | 100.0 | 100.0 | 27 | 0.0 | 0.0 | 28 | 0.0 | 12.5 |
| C1355 | 232 | 1 | 100.0 | 100.0 | 5 | 0.0 | 85.7 | 5 | 0.0 | 57.1 |
| C1908 | 224 | 1 | 100.0 | 100.0 | 16 | 0.0 | 0.0 | 15 | 0.0 | 0.0 |
| C2670 | 402 | 1 | 100.0 | 100.0 | 9 | 0.0 | 75.0 | 5 | 0.0 | 41.7 |
| C3540 | 786 | 1 | 100.0 | 100.0 | 14 | 0.0 | 87.5 | 10 | 0.0 | 83.3 |
| C5315 | 1234 | 1 | 100.0 | 94.6 | 19 | 16.7 | 94.6 | 7 | 41.7 | 86.5 |
| C6288 | 2426 | 2 | 91.7 | 100.0 | 31 | 62.5 | 83.6 | 32 | 62.5 | 76.7 |
| C7552 | 1308 | 1 | 92.3 | 100.0 | 35 | 0.0 | 94.9 | 29 | 0.0 | 94.9 |
| Avg. | | | 98.4 | 99.5 | | 7.9 | 60.5 | | 10.4 | 51.9 |

A method of accurately extracting critical nodes significantly affecting the timing yield of a circuit involves directly confirming how much timing change of a node affects the timing yield of the circuit according to the definition of TYC. The method will be referred to as a reference critical node identification method (RM) hereinafter. The calculation complexity of the most accurate RM is as high as $0(n_2)$, and thus it is difficult to apply the RM practically. However, the RM is used herein to evaluate performance of the method of calculating TYC using linear approximation.

ISCAS 85 benchmark circuits are used to evaluate usefulness and efficiency of the method of calculating TYC. A cell library for mapping the benchmark circuits is set based on a predictive technology model (PTM) 65 nm process model and in consideration of variations of process parameters such as channel length of a transistor, oxide thickness, and threshold voltage. It is assumed that each of the considered process parameters has a normal distribution, and a 3 σ value of each of the process parameters is determined to be 14.1% of the mean value of the same. Furthermore, 10 fsec is used as the δ E (node delay) for the proposed method of calculating TYC.

For evaluation of usefulness of timing criticalities, it is confirmed whether the most critical node (MCN) based on each of timing criticalities is identical to the MCN extracted in the RM, and it is confirmed how many of critical nodes extracted based on each of the timing criticalities are included in a group of critical nodes extracted by the RM. In table 1, the sequence of the MCN based on each of the timing criticalities indicates orders of effect caused by the critical nodes extracted by the RM in descending order. Furthermore, the [%] of critical nodes indicates a ratio that critical nodes belonging to the top 1% and 3% of critical nodes based on each of timing criticalities are included in a group of critical nodes belonging to the top 1% and 3% of critical nodes extracted by the RM.

As shown in Table 1, it is clear that critical nodes can be extracted more accurately according to the present invention, as compared with the performances of the criticality of the reference 1 and the sensitivity of the reference 2.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of extracting critical gates for optimizing statistical timing of an integration circuit, the method comprising:

applying subtle changes of mean arrival times with respect to each of nodes in a timing graph of an integrated circuit to ADD operations and MAX operations of a block-based statistical static timing analysis (SSTA) method and approximating the corresponding operations;

generating Jacobian matrixes between each node by using matrix components including differential coefficients calculated during linear approximation of the operations;

calculating, using a computer, changed arrival time values of the circuit by propagating the Jacobian matrixes from a virtual sink node to a virtual source node; and calculating timing yield criticalities, which are variances of timing yield of the circuit due to subtle changes of mean arrival times with respect to each node, based on values obtained by the propagation.

2. The method of claim 1, wherein, when a mean arrival time $a_0$ of a first node is changed to $\delta a_0$, a changed arrival time C' of a third node, which is directly connected to a first node as an output node of the first node, is approximated by multiplying differential coefficients of delay components of the third node by $\delta a_0$, in the approximation of the_MAX operations.

3. The method of claim 2, wherein the changed arrival time C' of the third node, which is directly connected to the first node and a second node as an output node of the first and second nodes, is approximated according to an equation $$C' = \max(A', B)$$
$$= (c_0 + \delta c_0) + \left(\sum_{i=1}^{n}(c_i + \delta c_i) \cdot \Delta X_i\right) +$$
$$(c_{n+1} + \delta c_{n+1}) \cdot \Delta R_C,$$
$$\therefore \begin{cases} \delta c_i \approx \dfrac{\partial c_i}{\partial a_0} \cdot \delta a_0, & 0 \leq i \leq n \\ \delta c_{n+1}^2 \approx \dfrac{\partial c_{n+1}^2}{\partial a_0} \cdot \delta a_0 \end{cases}$$

where A' indicates a changed arrival time of the first node, B indicates an arrival time of the second node, $a_0$ is the mean arrival time of the first node, $c_0$ is the mean arrival time of the third node, $c_i$ is the delay sensitivity of $\Delta X_i$, $c_{n+1}$ is the delay sensitivity with respect to $\Delta R_c$, $\Delta X_i$ is a variation of the global parameter $X_i$, and $\Delta R_c$ is a variation from the mean value of the independent random variable $R_c$.

4. The method of claim 3, wherein a changed arrival time E' of a fifth node, which is indirectly connected to the first node as an output node of the first node, is approximated according to the chain rule of differential coefficients, in the approximation of the MAX operations.

5. The method of claim 4, wherein the changed arrival time E' of the fifth node is defined as shown in an equation $$E' = \max(C', D)$$
$$= (e_0 + \delta e_0) + \left(\sum_{i=1}^{n}(e_i + \delta e_i) \cdot \Delta X_i\right) +$$
$$(e_{n+1} + \delta e_{n+1}) \cdot \Delta R_E$$
$$\therefore \begin{cases} \delta e_i \approx \dfrac{\partial e_i}{\partial a_0} \cdot \delta a_0, & 0 \leq i \leq n \\ \quad = \left(\sum_{j=1}^{n} \dfrac{\partial e_i}{\partial c_j} \cdot \dfrac{\partial c_j}{\partial a_0} + \dfrac{\partial e_i}{\partial c_{n+1}^2} \cdot \dfrac{\partial c_{n+1}^2}{\partial a_0}\right) \cdot \delta a_0 \\ \delta e_{n+1}^2 \approx \dfrac{\partial e_{n+1}^2}{\partial a_0} \cdot \delta a_0 \\ \quad = \left(\sum_{j=1}^{n} \dfrac{\partial e_{n+1}^2}{\partial c_j} \cdot \dfrac{\partial c_j}{\partial a_0} + \dfrac{\partial e_{n+1}^2}{\partial c_{n+1}^2} \cdot \dfrac{\partial c_{n+1}^2}{\partial a_0}\right) \cdot \delta a_0, \end{cases}$$

where D indicates an arrival time of the fourth node, $a_0$ is the mean arrival time of the first node, $c_j$ is the delay sensitivity of the variation of global parameter $X_j$, $c_{n+1}$ is the delay sensitivity with respect to $\Delta R_c$, $e_0$ is the mean arrival time of the fifth node, $e_i$ is the delay sensitivity of $\Delta X_i$, $e_{n+1}$ is the delay sensitivity with respect to $\Delta R_E$, $\Delta X_i$ is a variation of the global parameter $X_i$, and $\Delta R_E$ is a variation from the mean value of the independent random variable $R_E$.

6. The method of claim 3, wherein differential coefficients for linear approximation of the MAX operation is calculated by partially differentiating output delay components with respect to input delay components.

7. The method of claim 1, wherein, if an arrival time A of a first node is a result of an ADD operation of arrival times B and C of second and third nodes and delay components in the first node are changed by as much as $\delta a_i$ (i=1, 2, ..., n+1), an arrival time C', which is changed due to a change of the arrival time A, is approximated according to an equation $$C' = \mathrm{add}(A', B)$$
$$= (c_0 + \delta c_0) + \left(\sum_{i=1}^{n}(c_i + \delta c_i) \cdot \Delta X_i\right) +$$
$$(c_{n+1} + \delta c_{n+1}) \cdot \Delta R_C$$
$$\therefore \begin{cases} \delta c_i = \dfrac{\partial c_i}{\partial a_i} \cdot \delta a_i, & 0 \leq i \leq n \\ \delta c_{n+1}^2 = \dfrac{\partial c_{n+1}^2}{\partial a_{n+1}^2} \cdot \delta a_{n+1}^2 \end{cases}$$

where A' indicates a changed arrival time of the first node, B indicates an arrival time of the second node, $a_i$ is the delay sensitivity of $\Delta X_i$, $c_0$ is the mean arrival time of the third node, $c_i$ is the delay sensitivity of $\Delta X_i$, $c_{n+1}$ is the delay sensitivity with respect to $\Delta R_c$, $\Delta X_i$ is a variation of the global parameter $X_i$, and $\Delta R_c$ is a variation from the mean value of the independent random variable $R_c$.

8. The method of claim 7, wherein differential coefficients for linear approximation of the ADD operation are calculated by partially differentiating output delay components with respect to input delay components of the ADD operation.

9. The method of claim 1, wherein propagation of the Jacobian matrixes from the virtual sink node to the virtual source node is performed using a backward breadth-first search method by multiplying the matrixes.

* * * * *